United States Patent
Komori (10) Patent No.: US 12,449,437 B2
(45) Date of Patent: Oct. 21, 2025

(54) AUTOMATIC SAMPLE INJECTION SYSTEM AND GAS CHROMATOGRAPHY ANALYSIS SYSTEM

(71) Applicant: Shimadzu Corporation, Kyoto (JP)

(72) Inventor: Yuki Komori, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 404 days.

(21) Appl. No.: 18/016,748

(22) PCT Filed: Jul. 22, 2020

(86) PCT No.: PCT/JP2020/028432
§ 371 (c)(1),
(2) Date: Jan. 18, 2023

(87) PCT Pub. No.: WO2022/018856
PCT Pub. Date: Jan. 27, 2022

(65) Prior Publication Data
US 2023/0288295 A1  Sep. 14, 2023

(51) Int. Cl.
*G01N 35/04* (2006.01)
*G01N 1/14* (2006.01)
*G01N 30/24* (2006.01)

(52) U.S. Cl.
CPC ............ *G01N 35/04* (2013.01); *G01N 1/14* (2013.01); *G01N 30/24* (2013.01); *G01N 2001/1463* (2013.01); *G01N 2035/0453* (2013.01)

(58) Field of Classification Search
CPC .......... G01N 1/14; G01N 30/24; G01N 35/04; G01N 2001/1463; G01N 2030/025; G01N 35/0099; G01N 2035/0453; G01N 30/18
See application file for complete search history.

(56) References Cited

U.S. PATENT DOCUMENTS

| 5,979,250 | A | 11/1999 | Tanihata | |
|---|---|---|---|---|
| 2020/0241028 | A1* | 7/2020 | Ju | G01N 35/0098 |
| 2022/0178887 | A1* | 6/2022 | Komori | G01N 30/16 |

FOREIGN PATENT DOCUMENTS

| CN | 1749757 A | * | 3/2006 | ......... G01N 35/0092 |
|---|---|---|---|---|
| EP | 0851232 A1 | * | 7/1998 | ............ G01N 35/00 |
| JP | 3-12554 | | 1/1991 | |
| JP | 9-325153 A | | 12/1997 | |
| JP | H10-170520 A | | 6/1998 | |

(Continued)

OTHER PUBLICATIONS

Japanese First OA for corresponding application No. JP 2022-538553 dated Aug. 1, 2021.

(Continued)

*Primary Examiner* — Benjamin R Schmitt
(74) *Attorney, Agent, or Firm* — Muir Patent Law, PLLC (57) ABSTRACT

An injector includes an injection device and a round turret provided on a front side of the injection device. A sampler is provided with a vial holder and a conveyance arm. The injector has an accessible structure in which a moving path of the conveyance arm of one sampler arranged on the side of the two injectors for accessing the round turret of each of the two injectors is secured regardless of the size of the round turret, when two injectors are arranged so that the back sides of the injection devices face to each other.

8 Claims, 4 Drawing Sheets

(56) References Cited

FOREIGN PATENT DOCUMENTS

WO         2009/031503 A1    3/2009
WO     WO-2020078022 A1 *  4/2020  ............ G01N 21/76

OTHER PUBLICATIONS

Written Opinion for PCT application No. PCT/JP2020/028432 dated Oct. 20, 2020.
First Office Action dated Jul. 8, 2025 for the Chinese Patent Application No. 202080104588.9 (English language machine translation).

* cited by examiner

AUTOMATIC SAMPLE INJECTION SYSTEM AND GAS CHROMATOGRAPHY ANALYSIS SYSTEM

TECHNICAL FIELD

The present invention relates to an automatic sample injection system for a gas chromatography analysis and a gas chromatography analysis system.

BACKGROUND ART

An automatic sample injection device (hereinafter referred to as "injector") for automatically injecting a sample into an analysis device for performing a gas chromatography analysis is known (see Patent Document 1). The injector is provided with a movable turret on which a plurality of vials each containing a sample is set and a syringe for suctioning the sample from the vial set on the turret. When injecting the sample into the gas chromatograph, the turret is moved such that the vial containing a target sample is placed at a predetermined position, and the sample in the vial placed at the predetermined position is suctioned by the syringe and injected into the analysis device.

Further, in some cases, an analysis device provided with two gas chromatography units is configured so that the gas chromatography analyses of a large number of samples can be efficiently performed. In such a case, two injectors are used to inject the samples into the gas chromatograph units.

Further, the turret of the injector is limited in the number of vials that can be set, and it is not possible to set all samples to the injector when the number of samples is large. For this reason, in some cases, a sampler for supplying vials each containing a sample to an injector is used together with the injector. A sampler includes a vial table on which a plurality of vials is arranged and a conveyance arm for conveying vials arranged on the vial table to the turret of the injector. When the sampler is used, on the turret of the injector, other than a vial (sample vial) containing a sample, a cleaning vial for cleaning a syringe and/or a waste liquid vial is often arranged.

PRIOR ART DOCUMENT

Patent Document

Patent Document 1: Japanese Unexamined Patent Application Publication No. H09(1997)-325153

SUMMARY OF THE INVENTION

Problems to be Solved by the Invention

An analysis device of a gas chromatograph is typically provided with an injection port for injecting a sample at the top surface of the housing. The injector is mounted on the housing of the analysis device so that the syringe is located above the injection port. In a case where two injectors are used together, when the syringes of the injectors are placed at a distance, it is required to provide the injection port of each of gas chromatograph units at positions away from each other. Therefore, the analysis device itself increases in size, which in turn increases the installation area of the entire analysis system. Therefore, in a case where two injectors are used together, it is desirable to arrange the syringes of the injectors close to each other.

Incidentally, there is a demand that a large number of vials is arranged on a turret of an injector. In a turret of an injector, there are a linear type in which vials are set along a straight line and a circular type in which vials are set along the same circumference. In the case of a straight-line turret, even in a case where two injectors and a sampler are used together, there is an advantage that the conveyance arm of the sampler can easily access the turret of each injector. However, in order to increase the number of vials that can be set, the length of the turret must be increased, which in turn increases the installation space for the injector.

On the other hand, in the case of a circular turret, there is an advantage that a large number of vials can be set in a width dimension shorter than a straight-line turret. However, when two injectors are used together, the turrets are likely to interfere with each other, thereby limiting the size of the turret. If two injectors are placed so that the turrets do not interfere with each other, the size of the injector is not limited. However, when the turrets are used in combination with a sampler, the housing of the injector or the like interferes with the conveyance arm of the sampler, making it difficult for the conveyance arm to access the injector.

The present invention has been made in view of the above-described problems, and an object of the present invention is to suppress an increase in the installation area of the entire analysis system when an analysis system is configured by using two injectors and one sampler in combination.

Means for Solving the Problems

An automatic sample injection system for a gas chromatography analysis according to the present invention, includes:
 at least one injector out of a plurality of injectors and a sampler configured to supply a vial containing a sample to the injector,
 wherein the injector includes
 an injection device having a front side and a rear side, the injection device being configured to collect the sample from the vial arranged at a predetermined position on the front side and inject the sample into an injection port of a gas chromatography analysis device;
 a round turret provided on the front side of the injection device, the round turret being provided with a plurality of vial ports for setting vials on the same circumference in a horizontal plane, the round turret being configured to be rotatable such that an arbitrary vial set to the vial port is capable of being arranged at a predetermined position on the circumference,
 wherein the sampler includes
 a vial holder configured to arrange a plurality of vials thereon in a plane, and
 a conveyance arm provided with a gripper for holding the vial at a distal end, the conveyance arm being configured to convey the vial between the round turret of the injector and the vial holder by operating the gripper within and outside an area where the vial holder is provided, and
 wherein the injector has an accessible structure in which a moving path of the conveyance arm of one sampler arranged on a side of the two injectors for accessing the round turrets of the two injectors when two injectors are arranged such that the back sides of the injection devices face to each other is secured regardless of a size of the round turret.

A gas chromatography analysis system according to the present invention includes:

an analysis device provided with a first gas chromatograph unit and a second gas chromatograph unit, the first gas chromatograph unit and the second gas chromatograph unit each being configured to perform a gas chromatography analysis and accommodated in a common housing; and an automatic sample injection system mounted on the housing of the analysis device, the automatic sample injection system including two injectors each for injecting a sample into each of the first gas chromatograph unit and the second gas chromatograph unit and one sampler for supplying a vial containing a sample to the two injectors, wherein the automatic sample injection system is the automatic sample injection system of the present invention, each of the two injectors having an injection device and a round turret, the sampler having a vial holder and a conveyance arm, and wherein the two injectors of the automatic sample injection system are arranged such that the back sides of the injection devices face to each other.

Effects of the Invention

According to the automatic sample injection system of the present invention, the injector has an accessible structure in which a moving path of the conveyance arm for one sampler arranged on a side of the two injectors for accessing the round turrets of the two injectors when two injectors are arranged such that back sides of the injection devices face to each other is secured regardless of the size of the round turret. Therefore, even in a case where two injectors and one sampler are used together, the two injectors can be arranged with the back sides of the injection devices faced to each other. When two injectors are arranged with the back sides of injection devices faced to each other, the round turrets of the injectors do not interfere with each other. Therefore, the injection devices of the injectors can be arranged close to each other, and accordingly, the two injection ports provided to the analysis devices can be arranged close to each other. Consequently, an increase in the installation area of the gas chromatography analysis system can be suppressed.

According to the gas chromatography analysis system of the present invention, two injectors of the automatic sample injection system are arranged such that the back sides of the injection devices face to each other face. Therefore, the injection devices of the injectors can be arranged close to each other, and therefore, the two injection ports of the analysis devices can be arranged close to each other. Consequently, an increase in the installation area of the gas chromatography analysis system can be suppressed.

EMBODIMENTS FOR CARRYING OUT THE INVENTION

Hereinafter, with reference to the attached drawings, one example of an automatic sample injection system according to the present invention and a gas chromatography analysis system provided with the automatic sample injection system will be described.

Figure 1:
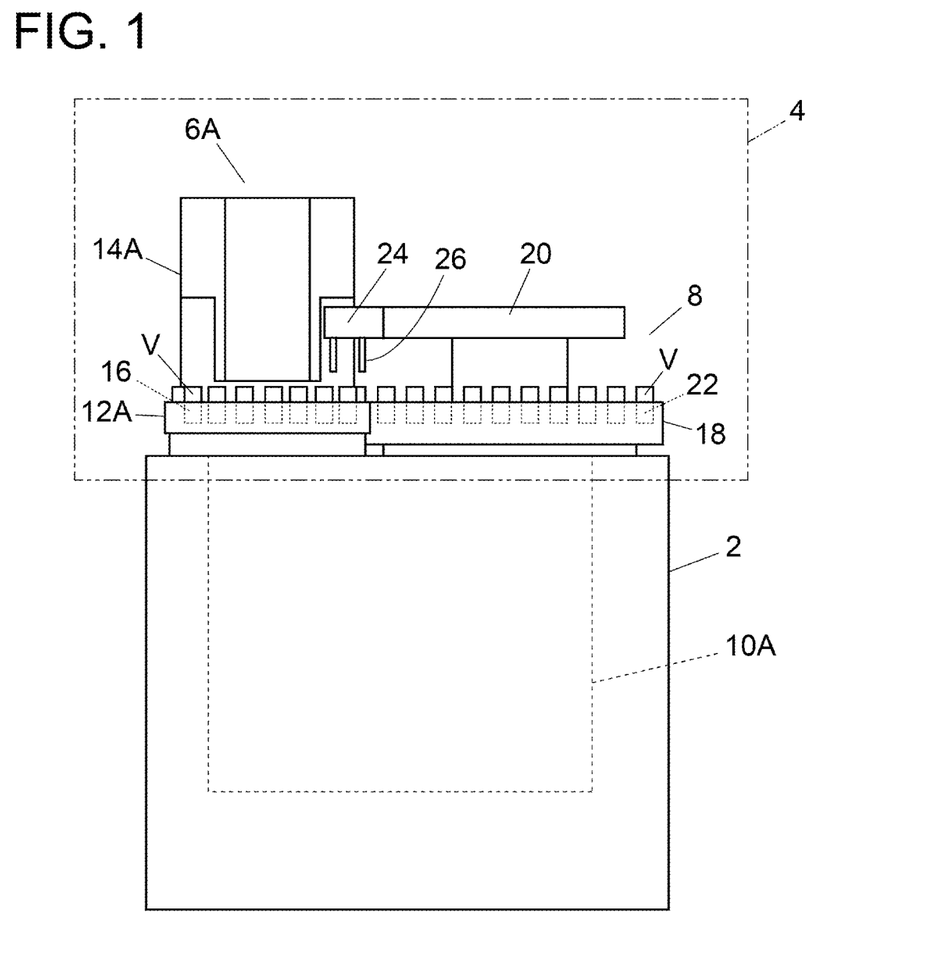
FIG. 1 is a front view showing one example of a gas chromatography analysis system.
Figure 2:
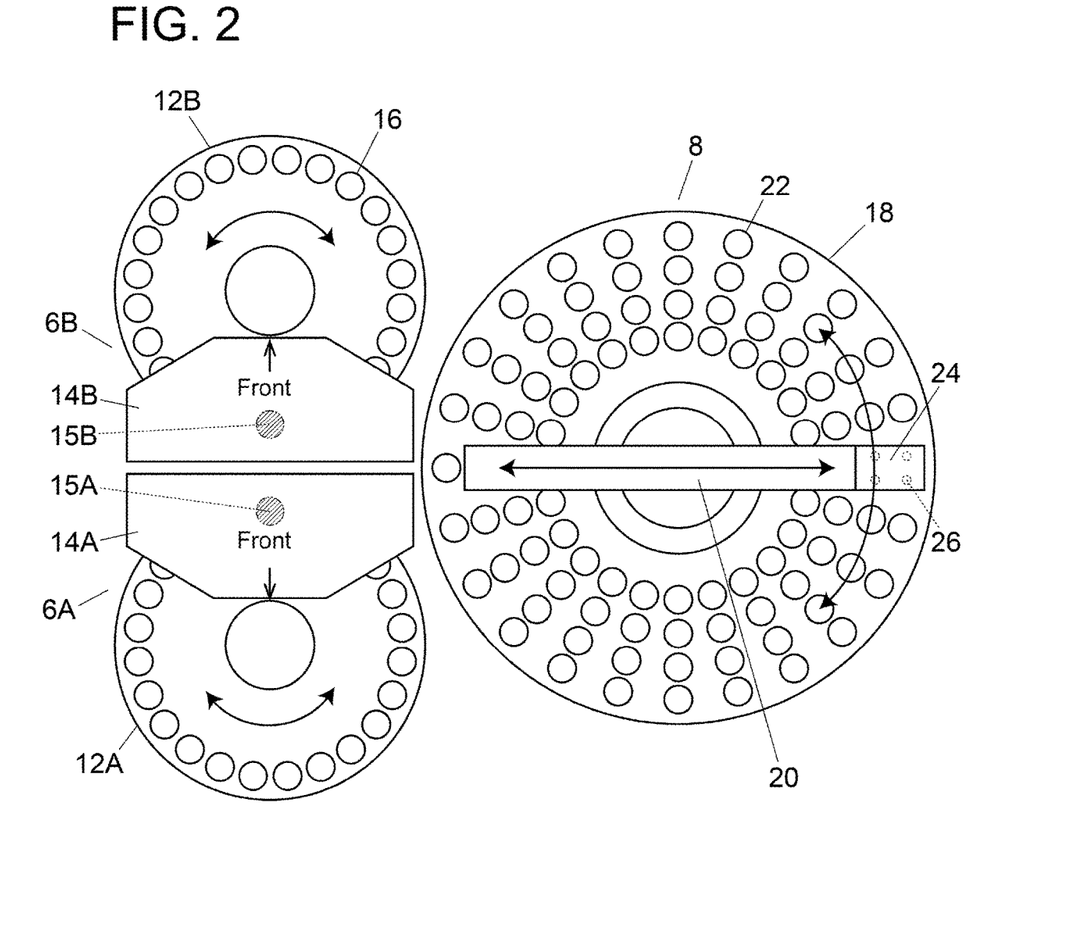
FIG. 2 is a plan view of the automatic sample injection system of the example as viewed from above.

FIG. 1 is a front view showing one example of a gas chromatography analysis system according to the present invention. FIG. 2 is a top plan view of a gas chromatography analysis system provided with an automatic sample injection system.

The gas chromatography analysis system is provided with an analysis device 2 and an automatic sample injection system 4. The automatic sample injection system 4 is provided with two injectors 6A and 6B and a sampler 8. The automatic sample injection system 4 is arranged on the housing of the analysis device 2. In FIG. 1, only the injector 6A arranged on the front side out of the two injectors 6A and 6B is shown.

The analysis device 2 is provided with two gas chromatograph units 10A and 10B (first and second gas chromatograph units) for independently performing a gas chromatography analysis in the housing. In FIG. 1, only the gas chromatograph unit 10A on the front side out of the two gas chromatograph units 10A and 10B is shown. Although not shown, each of the gas chromatograph units 10A and 10B is provided with a sample vaporization chamber for vaporizing a sample to generate a sample gas, a separation column for separating components in the sample gas generated in the sample vaporization chamber, and a detector for detecting the components separated in the separation column. An injection port for injecting the sample into the sample vaporization chambers of the respective gas chromatograph units 10A and 10B is provided on the upper surface of the housing of the analysis device 2.

The injector 6A of the automatic sample injection system 4 is provided with a round turret 12A having a plurality of vial ports 16 for setting vials V on the same circumference and an injection device 14A. The injection device 14A is configured to collect the sample from the vial V arranged at a predetermined position by the syringe 15A and inject the sample to the injection port of the gas chromatograph unit 10A. The injector 6B has the same configuration as that of the injector 6A and is provided with a round turret 12B and an injection device 14B.

As shown in FIG. 2, the injection devices 14A and 14B of the injectors 6A and 6B each have a front side and a back side. Each of the round turrets 12A and 12B is provided on the front side of each of the injection devices 14A and 14B. The round turret 12A, 12B rotates to place an arbitrary vial V set on the vial port 16 to a predetermined position for suctioning the sample by the syringe 15A, 15B.

The injectors 6A and 6B are arranged such that the front side of the injection device 14A (on the side where the round turret 12A is provided when viewed from the injection device 14A) and the front side of the injection device 14B (on the side where the round turret 12B is provided when viewed from the injection device 14B) face opposite to each other, and the back sides of the injection devices 14A and 14B (the side opposite to the front side) face to each other. With such an arrangement of the injectors 6A and 6B, the round turrets 12A and 12B do not interfere with each other, and therefore, the injection device 14A and 14B are arranged in close proximity to each other.

The sampler 8 is provided on the sides of the injectors 6A and 6B for supplying the vials V each containing a sample to the round turrets 12A and 12B of the injectors 6A and 6B. The sampler 8 is provided with a vial holder 18 and a conveyance arm 20. The vial holder 18 is a round table provided with a plurality of vial ports for setting vials V in the same plane so that a plurality of vials V is arranged in a planar manner. The conveyance arm 20 is provided to extend horizontally above the vial holder 18 and is provided with a gripper 24 for holding a vial V at the distal end. The conveyance arm 20 can place the gripper 24 to a position above an arbitrary vial port 22 of the vial holder 18 and a predetermined delivery position set on the outside of the vial holder 18 by the rotational movement in the horizontal plane about a center of the vial holder 18 as a rotation center and the slide movement in the axial direction.

The gripper 24 is provided with a plurality of claws 26 extending downward to grip the outer peripheral surface of a vial V from above. The claws 26 of the gripper 24 are provided at four equal locations on the same circumference to evenly grip the outer peripheral surface of the vial V. In the following description, the center of the circumference along which the claws 26 are arranged is defined as a center of the gripper 24. In the gripper 24, the claws 26 are moved point-symmetrically about the center of the gripper 24 to grip and release the outer peripheral surface of a vial V, and the conveyance arm 20 is moved up and down, or the claws 26 are moved up and down to thereby lift the vial V and set the vial V to the vial port.

Figure 3:
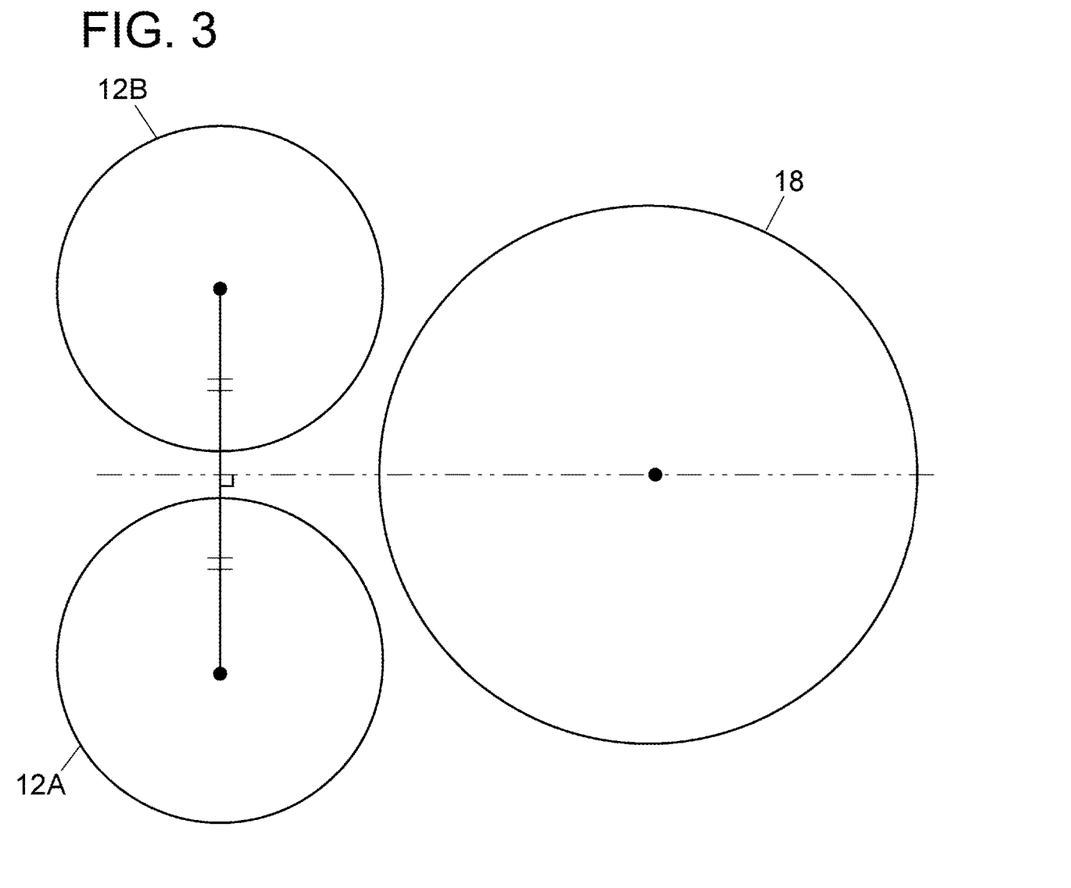
FIG. 3 is a conceptual diagram for describing a positional relation between two injectors and one sampler.

As shown in FIG. 3, in this example, the injectors 6A and 6B and the sampler 8 are arranged such that the center of the vial holder 18 (i.e., the rotation center of the conveyance arm 20) is located on the perpendicular bisector of the line segment connecting the center of the round turret 12A and the center of the round turret 12B. Such an arrangement is intended to minimize the installation area of the automatic sample injection system 4 composed of the injectors 6A and 6B and the sampler 8. Note that the arrangement of the injectors 6A and 6B and the sampler 8 is not limited thereto, but in order to reduce the installation area of the automatic sample injection system 4, it is preferable that the center of the vial holder 18 be closely arranged to the perpendicular bisector of the line segment connecting the center of the round turret 12A and the center of the round turret 12B. In such an arrangement in which the injectors 6A and 6B face away from each other, when the sampler 8 delivers the vial V to the injector 6A, 6B, the conveyance arm 20 accesses the round turret 12A, 12B from obliquely behind the injection device 14A, 14B.

Figure 4:
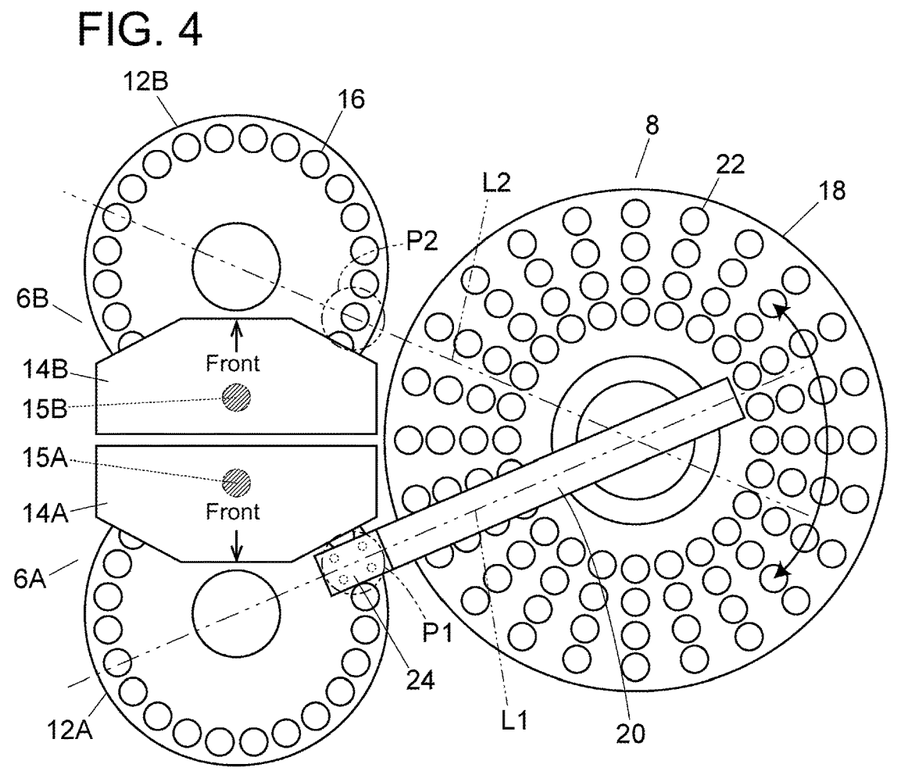
FIG. 4 is a diagram showing a state when a conveyance arm of the automatic sample injection system accesses a round turret of an injector as viewed from above.

As shown in FIG. 4, the injectors 6A and 6B each has an accessible structure that enables for the conveyance arm 20 to access the round turrets 12A and 12B from the side of the back side of the injection devices 14A and 14B. Specifically, the injectors 6A and 6B each has a housing configuration in which the injection device 14A, 14B does not interfere with the conveyance arm regardless of the outer diameter of the round turret 12A, 12B when the conveyance arm 20 moves the gripper 24 to the position of the vial port 16 of each of the round turrets 12A and 12B located on the straight line L1, L2 connecting the rotation center of the conveyance arm 20 and the center of each of the round turrets 12A and 12B. In order to realize such a housing configuration, the arrangement of the components of the injection devices 14A and 14B is devised. In the embodiment shown in the drawings, the accessible structure is realized by providing a cut-out on the housing of each of the injection devices 14A and 14B. However, the accessible structure may be realized by other structures, such as, e.g., a structure in which a recess for securing a path for moving the gripper 24 toward the center of each of the round turrets 12A and 12B is provided in the housing of each of the injection devices 14A and 14B.

Since the injectors 6A and 6B are each provided with the above-described accessible structure, it is possible to set the delivery position between the conveyance arm 20 and the round turrets 12A and 12B at the positions P1 and P2 on the straight lines L1 and L2 connecting the rotation center of the conveyance arm 20 and the respective centers of the round turrets 12A and 12B.

Figure 5:
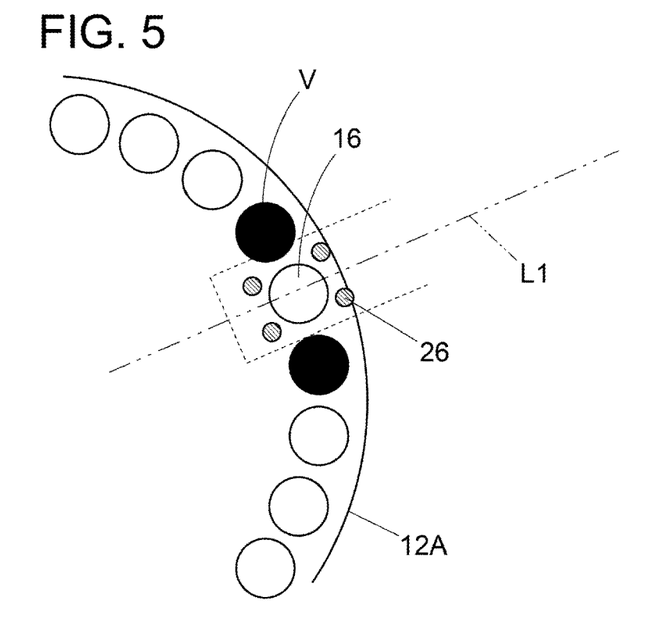
FIG. 5 is a conceptual diagram for explaining positions of claws of a gripper when the conveyance arm conveys a vial to and from the turret of the injector.

In this example, each of the claws 26 of the gripper 24 is provided at each of four corners of a square having two sides parallel to the axial direction of the conveyance arm 20. That is, there exist no claws 26 on a straight horizontal line perpendicular to the axial direction of the conveyance arm 20 and passing through the center of the gripper 24. For this reason, when it is configured to deliver the vial V on the straight lines L1 and L2, as shown in FIG. 5, the claws 26 are not positioned between the target vial port 16 and the adjacent vial port 16 when the gripper 24 is positioned above the vial port 16 of the round turret 12A, 12B. Therefore, even when a vial V is set between adjacent vial ports 16, the adjacent vials V do not interfere with the claws 26. That is, even in a case where the distance between vial ports 16 on the round turret 12A, 12B is narrowed, the conveyance arm 20 can deliver the vial V to and from the round turrets 12A and 12B without being interfered by the vial V set to the adjacent vial ports 16. Therefore, the number of vials V that can be set to the round turret 12A, 12B can be increased as many as possible. Consequently, the outer diameter of the round turret 12A, 12B can be reduced.

Further, each of the injectors 6A and 6B has a bilaterally symmetrical structure as viewed from the front sides of the injection devices 14A and 14B. Therefore, even if the sampler 8 is placed at a position opposite to the example (the position on the left side of the injectors 6A and 6B in FIG. 2), the conveyance arm 20 of the sampler 8 can access each of the round turret 12A, 12B in the same way. This means that the arrangement of the injector 6A, 6B and the sampler 8 can be changed according to the design of the analysis device 2.

Note that the example described above assumes that two injectors and one sampler are used in combination and is not intended that two injectors and one sampler are essential components of the automatic sample injection system of the present invention. Embodiments of the automatic sample injection system also include an embodiment configured by only one injector, an embodiment configured by one injector and one sampler, and an embodiment configured by two injectors. For example, like the above-described example, in a case where two injectors and one sampler construct an automatic sample injection system, it may be configured such that the automatic sample injection system is constructed only by one injector by removing the injector and/or the sampler, by one injector and one injector, or by two injectors.

In a case where the automatic sample injection system is configured by two injectors, by arranging two injectors such that the back sides of the injection devices face to each other, it is possible to prevent the round turrets from interfering with each other regardless of the size of the round turret. In addition, in a case where the automatic sample injection system is configured by only one injector, since the injector has the above-described accessible structure, when adding an injector and/or a sampler as needed, the arrangement as shown in FIG. 2 can be realized, so that a compact system-construction can be achieved.

Embodiments of the automatic sample injection system according to the present invention and embodiments of the gas chromatography analysis system are as follows.

An embodiment of the automatic sample injection system according to the present invention is directed to an automatic sample injection system for a gas chromatography analysis, comprising:

at least one injector out of a plurality of injectors and a sampler configured to supply a vial containing a sample to the injector, wherein the injector includes an injection device having a front side and a rear side, the injection device being configured to collect the sample from the vial arranged at a predetermined position on the front side and inject the sample into an injection port of a gas chromatography analysis device;

a round turret provided on the front side of the injection device, the round turret being provided with a plurality of vial ports for setting vials on the same circumference in a horizontal plane, the round turret being configured to be rotatable such that an arbitrary vial set to the vial port is capable of being arranged at a predetermined position on the circumference, wherein the sampler includes a vial holder configured to arrange a plurality of vials thereon in a plane, and a conveyance arm provided with a gripper for holding the vial at a distal end, the conveyance arm being configured to convey the vial between the round turret of the injector and the vial holder by operating the gripper within and outside an area where the vial holder is provided, and wherein the injector has an accessible structure in which a moving path of the conveyance arm of one sampler arranged on a side of the two injectors for accessing the round turrets of the two injectors when two injectors are arranged such that the back sides of the injection devices face to each other is secured regardless of a size of the round turret.

In a first aspect of embodiment, the conveyance arm of the sampler is configured to rotate in a horizontal plane and move the gripper in a radial direction of a circle centered on a rotation center of the conveyance arm, and the accessible structure is configured to secure a path for moving the gripper to a position above the vial port of the round turret in which the conveyance arm is arranged on a straight line connecting the rotation center and a center of the round turret when two of the injectors are arranged with the back sides faced to each other and the sampler is arranged such that the rotation center of the conveyance arm is positioned on or near a vertical bisector of a straight line connecting the centers of the round turrets of the two injectors.

With this configuration, it is possible to set the delivery position of the vial between the conveyance arm and the round turret at a position on a straight line connecting the rotation center of the conveyance arm and the center of the round turret. This enables the vial to be delivered at the nearest position from the rotation center of the conveyance arm, thereby improving the vial conveyance efficiency.

In the above first aspect of the present invention, it may be configured such that the injector is configured to move the round turret such that the vial port used for the delivery is set at a delivery position on a straight line connecting the rotation center of the conveyance arm and the center of the round turret when delivering the vial to and from the conveyance arm, and wherein the sampler is configured to operate the conveyance arm such that the gripper is positioned at the delivery position when delivering the vial to and from the injector.

In the above case, it is preferable that the gripper have a plurality of craws point-symmetrically movable in plane about a center of the gripper as an axis for grasping an outer peripheral surface of the vial, and wherein the plurality of claws is arranged at positions different from a position on a horizontal straight line perpendicular to an axial direction of the conveyance arm and passing through the center of the gripper.

With this configuration, when the gripper is positioned above the vial port of the round turret, the craws are not positioned between the target vial port and the adjacent vial port. Thus, even when the vials are set on the adjacent vial ports, the vial set between the adjacent vial ports does not interfere with the craws. That is, even if the distance between the vial ports on the round turret is narrowed, the craws do not interfere with the vial set between adjacent vial ports, which enables the gripper of the conveyance to deliver the vial to and from the round turrets. Therefore, the number of vials that can be set in the round turret can be increased as many as possible, which in turn can reduce the outer diameter of the round turret.

In a second aspect of the embodiment, the injector has a structure laterally symmetrical as viewed from the front side of the injection device. According to this configuration, the arrangement of the injector and the sampler can be changed according to the design of the gas chromatography analysis device.

An embodiment of the gas chromatography analysis system according to the present invention is provided with:

an analysis device provided with a first gas chromatograph unit and a second gas chromatograph unit, the first gas chromatograph unit and the second gas chromatograph unit each being configured to perform a gas chromatography analysis and accommodated in a common housing; and an automatic sample injection system mounted on the housing of the analysis device, the automatic sample injection system including two injectors each for injecting a sample into each of the first gas chromatograph unit and the second gas chromatograph unit and one sampler for supplying a vial containing a sample to the two injectors, wherein the automatic sample injection system is the automatic sample injection system as recited in claim 1, each of the two injectors having an injection device and a round turret, the sampler having a vial holder and a conveyance arm, and wherein the two injectors of the automatic sample injection system are arranged such that the back sides of the injection devices face to each other.

In the above-described embodiment, it may be configured such that the conveyance arm of the sampler of the automatic sample injection system has a gripper for holding the vial at its distal end and is configured to rotate in a horizontal plane and move the gripper in a radial direction of a circle centered on a rotation center of the conveyance arm.

In this case, the sampler can be arranged such that the rotation center of the conveyance arm is positioned on or near a vertical bisector of a straight line connecting the centers of the round turrets of the two injectors.

With such an arrangement, the installation area of the automatic sample injection system can be reduced.

DESCRIPTION OF SYMBOLS

2: Analysis device
4: Automatic sample injection system
6A, 6B: Injector
8: Sampler
10A, 10B: Gas chromatograph unit
12A, 12B: Round turret
14A, 14B: Injection device
15A, 15B: Syringe
16: Vial port
18, 22: Vial holder
20: Conveyance arm
24: Gripper
26: Craw

The invention claimed is:

1. An automatic sample injection system for a gas chromatography analysis, comprising:
   two injectors; and
   a sampler configured to supply a vial containing a sample to each of the two injectors,
   wherein each of the two injectors includes:
      an injection device having a front side and a rear side, the injection device being configured to collect the sample from the vial arranged at a predetermined position on the front side and inject the sample into an injection port of a gas chromatography analysis device; and
      a round turret provided on the front side of the injection device, the round turret being provided with a plurality of vial ports for setting vials on the same circumference in a horizontal plane, the round turret being configured to be rotatable such that an arbitrary vial set to the vial port is capable of being arranged at a predetermined position on the circumference of the round turret,
   wherein the sampler includes:
      a vial holder configured to arrange a plurality of vials thereon in a plane, and
      a conveyance arm provided with a gripper for holding the vial at a distal end, the conveyance arm being configured to convey the vial between the round turret of the injector and the vial holder by operating the gripper within and outside an area where the vial holder is provided,
   wherein the two injectors are arranged such that the rear sides of the injection devices face to each other,
   wherein the sampler is arranged on a side of the two injectors, and
   wherein each of the two injectors has an accessible structure in which a moving path of the conveyance arm for accessing each of the round turrets of the two injectors is secured.

2. The automatic sample injection system as recited in claim 1,
   wherein each of the two injectors has a structure that is laterally symmetrical as viewed from the front side of the injection device.

3. A gas chromatography analysis system comprising:
   an analysis device provided with a first gas chromatograph unit and a second gas chromatograph unit, the first gas chromatograph unit and the second gas chromatograph unit each being configured to perform a gas chromatography analysis and accommodated in a common housing; and
   an automatic sample injection system mounted on the common housing of the analysis device, the automatic sample injection system including two injectors each for injecting a sample into each of the first gas chromatograph unit and the second gas chromatograph unit and one sampler for supplying a vial containing a sample to the two injectors,
   wherein the automatic sample injection system is the automatic sample injection system as recited in claim 1, each of the two injectors having the injection device and the round turret, the sampler having the vial holder and the conveyance arm, and
   wherein the two injectors of the automatic sample injection system are arranged such that the rear sides of the injection devices face each other.

4. The gas chromatography analysis system as recited in claim 3,
   wherein the conveyance arm of the sampler of the automatic sample injection system has a gripper for holding the vial at its distal end and is configured to rotate in the horizontal plane and move the gripper in a radial direction of a circle centered on a rotation center of the conveyance arm, and
   wherein the sampler is arranged such that the rotation center of the conveyance arm is positioned on or near a vertical bisector of a straight line connecting the centers of the round turrets of the two injectors.

5. The automatic sample injection system as recited in claim 1,
   wherein the conveyance arm of the sampler is configured to rotate in a horizontal plane and move the gripper in a radial direction of a circle centered on a rotation center of the conveyance arm, and
   wherein the conveyance arm is configured to move the gripper along a straight line connecting the rotation center of the conveyance arm and a center of the round turret when conveying the vial between the round turret and the vial holder.

6. An automatic sample injection system for a gas chromatography analysis, comprising:
   two injectors; and
   a sampler configured to supply a vial containing a sample to each of the two injectors,
   wherein each of the two injectors includes:
      an injection device having a front side and a rear side, the injection device being configured to collect the sample from the vial arranged at a predetermined position on the front side and inject the sample into an injection port of a gas chromatography analysis device, and
      a round turret provided on the front side of the injection device, the round turret being provided with a plurality of vial ports for setting vials on the same circumference in a horizontal plane, the round turret being configured to be rotatable such that an arbitrary vial set to the vial port is capable of being arranged at a predetermined position on the circumference of the round turret,
   wherein the sampler includes:
      a vial holder configured to arrange a plurality of vials thereon in a plane, and
      a conveyance arm provided with a gripper for holding the vial at a distal end, the conveyance arm being configured to convey the vial between the round turret of the injector and the vial holder by operating the gripper within and outside an area where the vial holder is provided, and wherein the sampler is arranged on a side of the two injectors when the two injectors are arranged such that the rear sides of the injection devices face each other, wherein each of the two injectors has an accessible structure in which a moving path of the conveyance arm for accessing each of the round turrets of the two injectors is secured, wherein the conveyance arm of the sampler is configured to rotate in the horizontal plane and move the gripper in a radial direction of a circle centered on a rotation center of the conveyance arm, and wherein the accessible structure is configured to secure a path for moving the gripper to a position above the vial port of the round turret in which the conveyance arm is arranged on a straight line connecting the rotation center and a center of the round turret when the two injectors are arranged with the back sides facing each other and the sampler is arranged such that the rotation center of the conveyance arm is positioned on or near a vertical bisector of a straight line connecting the centers of the round turrets of the two injectors.

7. The automatic sample injection system as recited in claim 6, wherein the injector is configured to move the round turret such that the vial port used for delivery of the vial is set at a delivery position on a straight line connecting the rotation center of the conveyance arm and the center of the round turret when delivering the vial to and from the conveyance arm, and wherein the sampler is configured to operate the conveyance arm such that the gripper is positioned at the delivery position when delivering the vial to and from the injector.

8. The automatic sample injection system as recited in claim 7, wherein the gripper has a plurality of claws that are point-symmetrically movable in plane about a center of the gripper as an axis for grasping an outer peripheral surface of the vial, and wherein the plurality of claws is arranged at positions different from a position on a horizontal straight line perpendicular to an axial direction of the conveyance arm and passing through the center of the gripper.

* * * * *